Dec. 20, 1960 G. D. PACKARD 2,965,007
CLAMP FOR MILLING ELONGATED WORKPIECES
Filed Aug. 13, 1958
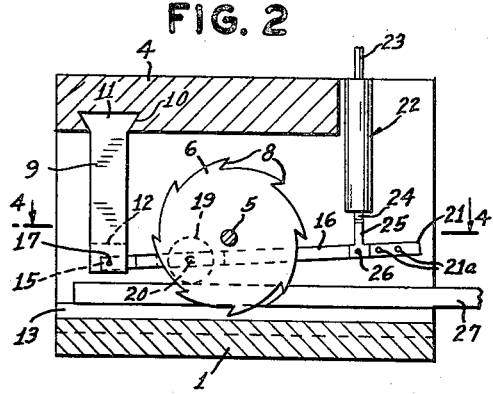
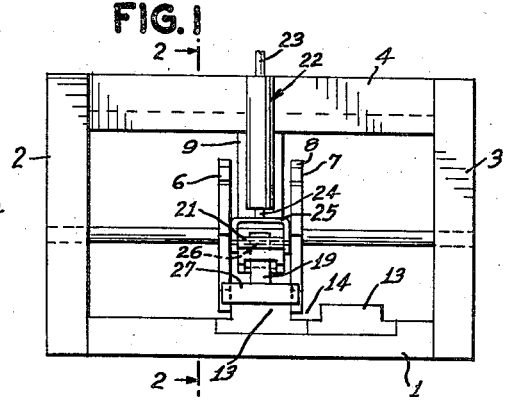
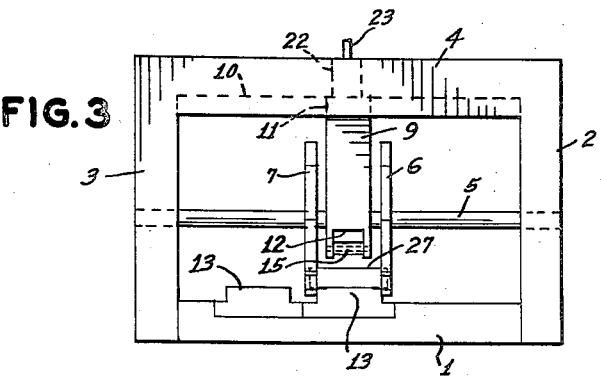
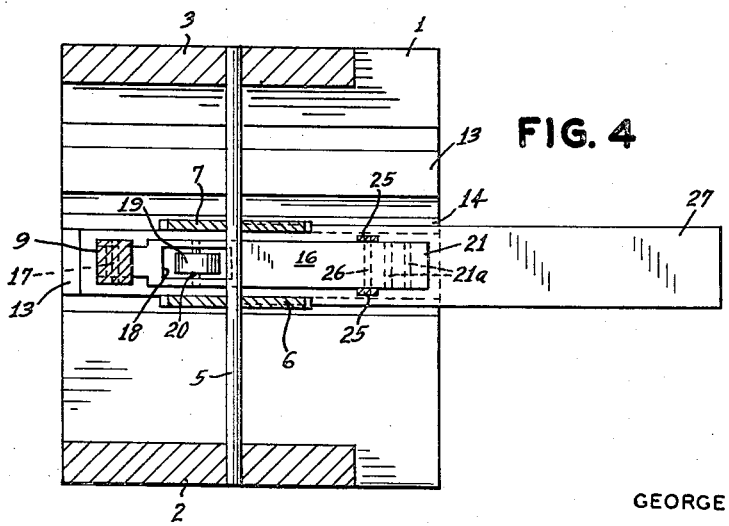
INVENTOR.
GEORGE D. PACKARD
BY Karl Huber
James E. Bryant
ATTORNEYS

United States Patent Office

2,965,007
Patented Dec. 20, 1960

2,965,007

CLAMP FOR MILLING ELONGATED WORKPIECES

George D. Packard, North Attleboro, Mass., assignor to Engelhard Industries, Inc., Newark, N.J., a corporation of Delaware Filed Aug. 13, 1958, Ser. No. 754,827

5 Claims. (Cl. 90—11)

The present invention deals with a clamp for milling elongated work pieces and more particularly with a clamp employed in combination with circular cutters for edge milling elongated metal work pieces.

In edge milling of elongated work pieces, the work pieces are passed into contact with circular cutters with the longitudinal sides or edges thereof positioned for milling or trimming by the cutters. In milling, the work piece or a stack of work pieces has a tendency to migrate laterally of the cutters during the milling operation, whereby it is difficult to maintain desirable tolerances. The migration of the work piece is especially difficult to control when the work piece is in the form of composite vertically stacked elongated members since there is a lateral migration or movement of stacked members relative to each other as well as movement of the stack laterally of the cutters. Furthermore, any handling movement of the stack at one end is reflected at the cutting or milling area unless the stack is restricted against movement at the cutting area. While guides may be employed at or near the cutting area in the milling of the work pieces, such guides are not sufficient to restrict movement of stacked members relative to each other under cutting pressure. Under substantial cutting pressure there is also vertical movement or a convex bowing laterally of the stack which is undesirable in providing for accurate identical cutting of each member of the elongated stack.

It is an object of the present invention to provide a clamp for milling elongated metal work pieces whereby the work pieces are clamped during the cutting operation. It is another object of the invention to provide a clamp for milling elongated work pieces and whereby the clamp is adjustable for optimum clamping pressures. Other objects and advantages of the invention will become apparent from the description hereinafter following and the drawings forming a part hereof, in which:

Figure 1 illustrates an elevational front view of a milling machine incorporating the invention, Figure 2 illustrates a partly sectional and partly elevational side view along lines 2—2 of Figure 1, Figure 3 illustrates a rear view of a milling machine incorporating the invention, and Figure 4 illustrates a partly sectional and partly elevational view along the lines 4—4 of Figure 2.

The invention deals with a clamp employed in combination with a cutter means for edge milling elongated work pieces, whereby the work piece or a stack of work pieces is secured against lateral movement or migration relative to the cutter means and between individual work pieces composing a stack during the cutting or milling operation, and thereby maintaining the cutting or milling within desirable tolerances.

Figures 1 through 4 illustrate a milling machine incorporating a clamp means according to the invention, with the clamp means and certain machine components constituting a combination apparatus. The milling machine comprises a base 1 having laterally spaced sides 2 and 3 extending upwardly therefrom and a beam 4 spaced vertically of the base 1 and bridging sides 2 and 3. An arbor or rotatable shaft 5 is rotatably mounted on sides 2 and 3 and connected therebetween and on which arbor or shaft is mounted at least one circular cutter 6 and preferably a plurality of cutters, e.g. a pair of cutters 6 and 7, spaced from each other axially of the arbor 5. The cutters are provided with circumferentially spaced peripheral cutting teeth 8. A support member or arm 9 depends from the beam 4 at a location rearwardly of the cutters 5 and 6. Preferably, the beam 4 is provided with a dove-tail slot 10 parallel with the arbor 5 and the support 9 is provided with correspondingly shaped end 11, whereby the support is laterally slideable in the slot 10. The support arm is provided with a recess or slot 12 in the terminal end thereof. The base 1 is provided with a rail 13 having a raised surface relative to the base and with the cutters 6 and 7 straddling the rail surface. Otherwise, the base 1 may be provided with functionally equivalent grooves 14 receptive to the cutting edge of the cutters. One end 15 of a lever 16 is rotatably mounted in the slot or recess 12 as at pivot 17 with the lever extending rearwardly therefrom beyond the cutters 6 and 7 between said cutters. A rectangular opening 18 is formed through the lever 16 preferably a short distance from the pivot 17, and a roller 19 is rotatably mounted on the lever 16, e.g. in the opening 18 on a shaft 20 mounted on the lever and bridging the opening 18. The free end portion 21 of the lever is provided with a plurality of spaced bores 21a transversely therethrough. A pressure means 22 is vertically mounted on the beam or in any satisfactory manner, and said pressure means being either an air or hydraulic cylinder to which a conduit 23 is connected. A piston 24 is mounted in the cylinder 22 and is provided with a Y shaped terminal with the legs 25 of the Y shaped terminal being rotatably connected to the free end 21 by means of a shaft 26 passing through one of a plurality of bores 21a, spaced longitudinally of the lever 16 whereby the cylinder may be selectively connected to the end 21 in accordance with a desired adjustable lever length.

In operation, a work piece 27 is positioned on rail 13 and is passed longitudinally thereof into cutting engagement with the cutters 6 and 7, the work piece being passed between the rail 13, or an equivalent base, and the pressurized roller 19 under pressure of the pressure means 22 at end 21 of the lever, whereby the roller 19 effectively clamps the work piece against the base or rail 13 while the longitudinal edges thereof are milled or cut by cutters 6 and 7.

In this manner, the work piece 27 or a stack of work pieces are gripped against migration with respect to the cutters or cutter or with respect to each other while passing through the cutting zone of a milling machine.

Various modifications of the clamp and cutter combination illustrated are contemplated within the scope of the appended claims.

What is claimed is:

1. In a milling machine including a base and cutter means mounted on a rotatable shaft above the base, clamp means comprising a support member positioned rearwardly of the cutter means, a lever having one end thereof pivotally connected to the support member and extending toward and beyond the cutter means between the shaft and base, roller means rotatably mounted on the lever between the free end thereof and the support member, the roller being contactable with a workpiece positioned on the base.

2. In a milling machine according to claim 1, comprising pressure means connected to the free end of the lever.

3. In a milling machine according to claim 1, comprising a pair of circular cutters mounted on the shaft and spaced from each other axially of the shaft, the lever extending between the cutters.

4. In a milling machine according to claim 1, wherein the roller is mounted on a roller shaft connected to the lever and positioned parallel with the cutter shaft.

5. In a milling machine according to claim 1, wherein the roller means is positioned between the support member and the cutter means.

References Cited in the file of this patent

UNITED STATES PATENTS

| | | |
|---|---|---|
| 2,560,843 | Brosemer | July 17, 1951 |
| 2,568,952 | Dailey | Sept. 25, 1951 |
| 2,643,584 | Wertepny et al. | June 30, 1953 |
| 2,675,742 | Petre | Apr. 20, 1954 |
| 2,746,139 | Pappelendam | May 22, 1956 |
| 2,814,974 | Crain | Dec. 3, 1957 |

FOREIGN PATENTS

| | | |
|---|---|---|
| 542,866 | Great Britain | Jan. 29, 1942 |